United States Patent
Chen (10) Patent No.: US 8,801,964 B2
(45) Date of Patent: Aug. 12, 2014

(54) ENCAPSULATED POLYMER NETWORK LIQUID CRYSTAL MATERIAL, DEVICE AND APPLICATIONS

(75) Inventor: Xianhai Chen, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 710 days.

(21) Appl. No.: 12/976,127

(22) Filed: Dec. 22, 2010

(65) Prior Publication Data

US 2012/0162596 A1    Jun. 28, 2012

(51) Int. Cl.
| | | |
|---|---|---|
| C09K 19/52 | (2006.01) | |
| C09K 19/54 | (2006.01) | |
| C09K 19/38 | (2006.01) | |
| G02F 1/1334 | (2006.01) | |
| G02F 1/1337 | (2006.01) | |

(52) U.S. Cl.
CPC ............................ *G02F 1/133703* (2013.01)
USPC .................. 252/299.01; 252/299.5; 349/88; 349/90; 349/199

(58) Field of Classification Search
USPC ............... 349/199, 88, 90; 252/299.01, 299.5
See application file for complete search history.

(56) References Cited

U.S. PATENT DOCUMENTS

| | | |
|---|---|---|
| 4,024,835 A | 5/1977 | Scheu et al. |
| 4,101,207 A | 7/1978 | Taylor |
| 4,738,880 A | 4/1988 | Asada et al. |
| 4,950,052 A | 8/1990 | Fergason et al. |
| 4,975,168 A | 12/1990 | Ohno et al. |
| 4,992,201 A | 2/1991 | Pearlman |
| 5,270,843 A | 12/1993 | Wang |
| 5,285,299 A | 2/1994 | Drzaic et al. |
| 5,351,143 A | 9/1994 | Sato et al. |
| 5,357,356 A | 10/1994 | Konuma et al. |
| 5,368,770 A | 11/1994 | Saupe et al. |
| 5,405,551 A | 4/1995 | Reamey et al. |
| 5,410,424 A | 4/1995 | Konuma et al. |

(Continued)

FOREIGN PATENT DOCUMENTS

| | | |
|---|---|---|
| CN | 1938398 A | 3/2007 |
| EP | 0493025 A2 | 7/1992 |

(Continued)

OTHER PUBLICATIONS

Schulte et al., "Fluorinated Polymer Dispersed Liquid Crystals: Electro-Optical and Morphological Properties," Dept of Materials Science and Engineering, Univ of Cincinnati (2), SAJC pp. 522-523.

(Continued)

*Primary Examiner* — Shean C Wu
(74) *Attorney, Agent, or Firm* — Kilpatrick Townsend & Stockton LLP (57) ABSTRACT

Polymer network liquid crystal materials have improved mechanical properties such as rigidity and hardness and substantially improved electro-optical performance. The PNLC material can be manufactured with an emulsion process so as to simplify substantially the manufacturing process. Each LC droplet can be configured with the polymer network extending substantially across the LC droplet, and the polymer network may comprise a material to lower substantially the switching voltage, such as a fluorinated acrylate that may interact with the liquid crystal so as to lower the surface tension of the LC droplet. The PNLC material may comprise an interfacial layer combined with the polymer network so as to decrease substantially the driving voltage.

19 Claims, 8 Drawing Sheets

(56) References Cited

U.S. PATENT DOCUMENTS

| | | | |
|---|---|---|---|
| 5,427,713 | A | 6/1995 | Wartenberg et al. |
| 5,432,461 | A | 7/1995 | Henley |
| 5,465,052 | A | 11/1995 | Henley |
| 5,499,121 | A | 3/1996 | Brewer |
| 5,615,039 | A | 3/1997 | Henley |
| 5,695,594 | A | 12/1997 | Lau et al. |
| 5,745,198 | A | 4/1998 | Havens et al. |
| 5,906,770 | A | 5/1999 | Amundson et al. |
| 5,951,912 | A | 9/1999 | Mercer |
| 5,976,405 | A | 11/1999 | Clikeman et al. |
| 6,012,858 | A | 1/2000 | Konishi et al. |
| 6,036,882 | A | 3/2000 | Chung |
| 6,108,062 | A | 8/2000 | Takeuchi et al. |
| 6,110,327 | A | 8/2000 | Rukavina et al. |
| 6,128,056 | A | 10/2000 | Kubota et al. |
| 6,146,792 | A | 11/2000 | Blanchet-Fincher et al. |
| 6,151,153 | A | 11/2000 | Bryan |
| 6,203,723 | B1 * | 3/2001 | Hsu ............... 252/299.01 |
| 6,211,991 | B1 | 4/2001 | Bryan |
| 6,270,691 | B2 | 8/2001 | Park et al. |
| 6,306,469 | B1 | 10/2001 | Serbutoviez et al. |
| 6,349,086 | B2 | 2/2002 | Nishida et al. |
| 6,392,725 | B1 | 5/2002 | Harada et al. |
| 6,407,797 | B1 | 6/2002 | Biradar et al. |
| 6,486,928 | B1 | 11/2002 | Lin et al. |
| 6,489,015 | B1 | 12/2002 | Tsuchiya et al. |
| 6,866,887 | B1 | 3/2005 | Chen et al. |
| 7,099,067 | B2 | 8/2006 | Chen |
| 7,452,961 | B2 | 11/2008 | Ueda et al. |
| 7,639,319 | B2 | 12/2009 | Chen |
| 7,817,333 | B2 | 10/2010 | Chen |
| 7,916,382 | B2 | 3/2011 | Chen |
| 2001/0018093 | A1 | 8/2001 | Decre |
| 2002/0130033 | A1 | 9/2002 | Beitinger et al. |
| 2002/0155280 | A1 | 10/2002 | Yang |
| 2005/0077005 | A1 | 4/2005 | Chen et al. |
| 2005/0270481 | A1 | 12/2005 | Blum et al. |
| 2008/0186563 | A1 * | 8/2008 | Chen ............... 359/322 |

FOREIGN PATENT DOCUMENTS

| | | | |
|---|---|---|---|
| EP | 0735519 | A2 | 10/1996 |
| EP | 1148385 | A1 | 10/2001 |
| EP | 1619541 | A1 | 1/2006 |
| JP | 4-081889 | A | 3/1992 |
| JP | 4-319909 | A | 11/1992 |
| JP | 5-273590 | A | 10/1993 |
| JP | 5-264462 | A | 12/1993 |
| JP | 7-181457 | A | 7/1995 |
| JP | 8-194208 | A | 7/1996 |
| JP | 9-001963 | A | 1/1997 |
| JP | 9-080396 | A | 3/1997 |
| JP | 2000-001675 | A | 1/2000 |
| JP | 2000-155308 | A | 6/2000 |
| JP | 2000-214791 | A | 8/2000 |
| JP | 2001-192289 | A | 7/2001 |
| JP | 2001-305728 | A | 11/2001 |
| JP | 2002-216401 | A | 8/2002 |
| JP | 2002-538985 | A | 11/2002 |
| JP | 2003-509531 | A | 3/2003 |
| JP | 2003-511808 | A | 3/2003 |
| JP | 2004-325497 | A | 11/2004 |
| WO | 00/53429 | A1 | 9/2000 |
| WO | 01/18128 | A2 | 3/2001 |
| WO | 01/26107 | A2 | 4/2001 |
| WO | 2005-101113 | A2 | 10/2005 |

OTHER PUBLICATIONS

Wu, et al., "Novel Fast-Switching Polymer-Dispersed Liquid-Crystal Light Shutter and Display," SID 92 Digest, pp. 583-586 (1992).
International Search Report and Written Opinion of PCT Application No. PCT/US08/52417, dated Jul. 9, 2008, 13 pages total.
English Translation of CN Office Action for Application No. 200580010165.6, mailed Aug. 14, 2009, 10 pages total.
Merck Specialty Chemicals Ltd., Southhampton, England, "Polymer Dispersed Liquid Crystals (PDLC)," Apr. 5, 2002, 15 pages.
PCT Preliminary Report on Patentability for Application No. PCT/US2005/012054, Dated Oct. 11, 2006.
PCT International Search Report of the International Searching Authority for Application No. PCT/US2005/012054, Dated Jul. 19, 2006.
PCT Written Opinion of the International Searching Authority for Application No. PCT/US2005/012054, Dated Jul. 19, 2006.
Office Action of Chinese Patent Application No. 094111240 and English Translation of Chinese Search Report, Dated Feb. 23, 2012.
English Translation of JP Office Action for Application No. 2007-507547, dated Nov. 1, 2010.
English Translation of JP Office Action for Application No. 2007-540433, dated Aug. 9, 2011.
English Translation of JP Office Action for Application No. 2009-548412, dated May 7, 2013.

* cited by examiner

ENCAPSULATED POLYMER NETWORK LIQUID CRYSTAL MATERIAL, DEVICE AND APPLICATIONS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is related to liquid crystal materials for use in electro-optic applications. More particularly, many embodiments of the present invention relate to liquid crystal/polymer composite materials, and methods and apparatus for the manufacture and application of such composite materials.

Voltage imaging technology may be employed to detect and measure for defects in flat panel thin film transistor (herein after "TFT") arrays. According to this measurement technique, the performance of a TFT array is simulated as if it were assembled into a TFT cell and then the characteristics of the TFT array are measured by indirectly measuring actual voltage distribution on the panel, or so-called voltage imaging, using an electro-optic (hereinafter "EO") light modulator-based detector.

A voltage imaging optical system (hereinafter "VIOS") in its most basic form includes an EO modulator, an imaging objective lens, a charge coupled device (CCD) camera or other appropriate or similar sensor, and an image processor. The electro-optic sensor of the EO modulator is based on the light scattering characteristics of liquid crystal (herein after "LC") droplets in a polymer matrix, for example nematic liquid crystal droplets in a polymer matrix (liquid crystal/polymer composite, or LC/polymer) film. In prior operation, the EO modulator is placed approximately 5-75 microns above the surface of a TFT array, and a voltage bias is applied across a transparent electrode of a layer of indium tin oxide (hereinafter "ITO") on a surface of the EO modulator. Thereupon, the EO modulator capacitively couples to the TFT array so that an electric field associated with the TFT array is sensed by the liquid crystal/polymer composite layer. The intensity of incident light transmitted through the LC/polymer layer is varied, i.e., is modulated, by any variations in the electric field strength across the liquid crystal (LC) material in the liquid crystal/polymer composite material. This light is then reflected off a dielectric mirror and collected by the CCD camera or like sensor. A source of incident radiation, which may be for example infrared or visible light, is provided so as to illuminate the LC/polymer film and dielectric mirror.

Due to the close proximity of components relative to panels under test (PUT), LC/polymer modulator structures can be subject to damage in normal use by unwanted particles, which can severely curtail the useful life. Thus, modulator lifetime improvement can be one of the major objectives in LC/polymer modulator research and development. For example, U.S. Pat. No. 7,817,333 discloses improved LC/polymer modulator structures. However, further improvements in switching voltage and gap distance without compromising mechanical properties of the LC modulator would be helpful.

Modulator sensitivity can be another important characteristic of an LC modulator device. Improved modulator sensitivity can lead to improved detection capability, and as such can be an important aspect of LC modulator development, in particular LC/polymer matrix research and development. Sensitivity for defect detection can be defined as the ratio of the change in transmitted light to the difference in voltage between a defective pixel and a good pixel on the TFT array. In addition, some applications such as LC displays for notebook computers and handheld devices can be sensitive to power consumption, such that prior displays having less than ideal sensitivity and higher than ideal voltages can lead to increased power consumption and decreased battery lifetime in at least some instances.

Work in relation with the present invention suggests that current LC materials and the current manufacturing testing methods associated therewith, may be less than ideal. For example, particulate contamination can damage test apparatus, for example a voltage imaging system and/or the panel under test. Also, test apparatus sensitivity may be less than ideal.

Polymer network liquid crystal (hereinafter "PNLC") can be a morphology of polymer stabilized liquid crystal (hereinafter "PSLC"), and the prior PNLC and PSLC materials may not be well suited for use with voltage imaging systems in at least some instances. For example, these prior materials may lack intrinsic mechanical strength and film hardness due to their low percentage of polymer, for example less than 10% in at least some instances. Although interfacial polymerization has been used to encapsulate liquid crystal and prepolymer mixture, such prior interfacial polymerization can be somewhat cumbersome and can provide a less than ideal LC material in at least some instances. For example, interfacial polymerization can produce a highly cross-linked hard shell layer, and such a cross-linked shell layer can undesirably affect the switching of liquid crystal contained within the shell.

While the above materials, apparatus and methods may be suitable for certain applications, there is a need in the art for improved electro-optic LC materials, more specifically improved sensitivity and life-time performance of electro-optic LC materials and test apparatus.

SUMMARY OF THE INVENTION

The present invention is related to liquid crystal materials for use in electro-optic applications. More particularly, many embodiments of the present invention relate to liquid crystal/polymer composite sensor materials, and methods and apparatus for the manufacture and application of such composite sensor materials. Merely by way of example, the materials, methods and apparatus of the present invention are described with reference to embodiments comprising a voltage imaging system. The materials, methods and apparatus of the present invention can be used with many other electro-optic applications, for example liquid crystal composite materials used in flat panel displays.

Embodiments of the present invention provide improved polymer network liquid crystal sensor materials having improved mechanical properties such as rigidity and hardness and the PNLC substantially improves electro-optical performance. The PNLC sensor materials can be manufactured with an emulsion process so as to simplify substantially the manufacturing process. The emulsion process can create a plurality of droplets of liquid crystal material having an appropriate distribution of sizes that can be within a range from about 1 um to about 10 um. The water based encapsulation process can be combined with UV curing so as to form the polymer network within plurality of droplets of the liquid crystal. In many embodiments, each LC droplet is configured with the polymer network extending substantially across the LC droplet, and the polymer network may contact the interfacial material or the polymer matrix at the outer boundary of the droplet without substantial anchoring of the polymer network. The polymer network of each of the plurality of liquid crystal droplets may comprise a material to lower substantially the switching voltage, such as a fluorinated acrylate, or a silicone acrylate, that may interact with the liquid crystal so as to lower the surface tension of the LC droplet. The encapsulated PNLC sensor material may comprise an interfacial layer combined with the polymer network so as to decrease substantially the driving voltage.

In many embodiments, a voltage imaging optical system comprises the electro-optical modulators made of the encapsulated PNLC material and has significantly improved defect detection and sensitivity without reduced mechanical properties such as reduced hardness. The modulators of the encapsulated PNLC material can also be operated at a much higher air gap with satisfactory defect detection sensitivity, so as to increase substantially the lifetime of the modulators when used with voltage imaging systems. In many embodiments, the encapsulated PNLC modulators can be operated with an air gap greater than 100 um above TFT panel, and an improvement in sensitivity to defects within a range from about 30% to about 70% can be achieved. The encapsulated PNLC modulators may have a substantially longer lifetime when operated at the higher air gap above TFT panel, as the probability of contact with the panels under test is reduced as well as the damage that may be related to particles or other residue on the panels. The probability of damage to the panel under test may also decrease.

Many embodiments provide an improved method of manufacturing the encapsulated PNLC material. The improved emulsification process can be used for encapsulation of the LC droplets, such that the multiple components of the PNLC material can be combined. The components of the PNLC emulsion prior to drying can be distributed such that a majority of each of the monomers, the prepolymers, and the photo-initiators is dissolved in droplets of the liquid crystal, and the liquid crystal droplets can be substantially surrounded by an interfacial compound after the emulsification process. The components of the PNLC emulsion may form within the emulsion so as to provide a complex PNLC structure during the emulsification and coating process. The materials of the emulsion comprising the liquid crystal, the interface layer, and the polymer network can be combined so as to further reduce the switching voltage of the LC droplet within the polymer matrix.

The PNLC material may comprise a plurality of components having structures configured so as to reduce substantially the switching voltage to transmit light. The PNLC material may comprise the plurality of droplets of the LC material so as to provide optical transmission in response to the driving voltage, the polymer network extending substantially across each of the droplets so to decrease the switching voltage, and the polymer matrix extending substantially around each droplet so as to provide mechanical rigidity and hardness. The PNLC sensor material may further comprise the interfacial layer so as to decrease the transmission voltage. The interfacial layer may encapsulate each droplet so as to reduce substantially the switching voltage, and the interfacial layer may comprise a double layer structure. The polymer matrix may comprise an amount of polymer sufficient so as to provide sufficient rigidity and hardness, for example with a weight ratio of polymer matrix to liquid crystal within a range from about 20/80 to about 50/50. The polymer matrix may comprise a polymer material such as polyurethane or polyacrylate latex, or mixtures thereof, so as to provide mechanical stability and film hardness. The polymer network may comprise one or more of many cross-linked materials, and may comprise a fluorinated component or a silicone acrylate component, or combinations thereof. The polymer network can provide an improved switching rate and increased light scattering so as to improve contrast.

In a first aspect, embodiments provide a liquid crystal sensor material. The liquid crystal sensor material comprises a plurality of liquid crystal droplets and a polymer matrix. Each droplet comprises a liquid crystal material and a polymer network comprising a plurality of crosslinked polymer chains. The polymer network is configured to decrease a light transmission voltage of the liquid crystal of the sensor material, such that light can be transmitted through the sensor material with decreased voltage. A polymer matrix is located around each of the plurality of liquid crystal droplets such that said each of the plurality of liquid crystal droplets is located within the polymer matrix.

In many embodiments, an interfacial agent is located between the polymer matrix and said each of the liquid crystal droplets so as to encapsulate said each of the plurality of liquid crystal droplets with the interfacial agent such that the polymer network is separated from the polymer matrix with the interfacial agent.

In another aspect, embodiments provide a method of manufacturing a sensor material. An emulsion is made such that the emulsion comprises a plurality of droplets of a liquid crystal material dispersed in an aqueous liquid. The droplets comprise a prepolymer dissolved in the liquid crystal material, and the aqueous liquid material comprises a water based polymer, such as a water soluble polymer or a water based latex or combinations thereof. The emulsion is dried such that the water soluble polymer or water based latex forms a polymer matrix located around each of the plurality of droplets. The dried emulsion is cured such that the prepolymer forms a polymer network within each of the plurality of droplets when the polymer matrix is located around said each of the plurality of droplets.

In another aspect, embodiments provide an electro-optic modulator assembly. The assembly comprises a transparent substrate, and a liquid crystal sensor material supported with the transparent substrate. The liquid crystal sensor material may comprise a plurality of liquid crystal droplets and a polymer matrix, in which droplet comprises a liquid crystal material and a polymer network comprising a plurality of crosslinked polymer chains. The interfacial agent can be located between the polymer matrix and said each of the liquid crystal droplets so as to encapsulate said each of the plurality of liquid crystal droplets with the interfacial agent such that the polymer network is separated from the polymer matrix with the interfacial agent.

DETAILED DESCRIPTION OF THE INVENTION

Embodiments of the present invention relate to liquid crystal materials for use in electro-optic applications. More particularly, embodiments of the present invention relate to liquid crystal/polymer composite materials, and methods and apparatus for the manufacture and application of such composite materials. Merely by way of examples in accordance with embodiments, the materials, methods and apparatus are described with reference to a voltage imaging system. The materials, methods and apparatus of embodiments of the present invention can be used with many other electro-optic applications, for example liquid crystal composite materials used in flat panel displays.

The following patents, assigned to Photon Dynamics Inc., describe the modulator assembly and LC material coating processes using such materials: "Modulator Transfer Process and Assembly", Michael A. Bryan, U.S. Pat. No. 6,151,153 (2000); "Modulator Manufacturing Process and Device", Michael A. Bryan, U.S. Pat. No. 6,211,991 B1 (2001); "Method for Manufacturing PDLC-Based Electro-Optic Modulator Using Spin Coating, Xianhai Chen, U.S. Pat. No. 6,866,887 B1 (2005); "Scratch and Mar Resistant PDLC Modulator", Xianhai Chen, U.S. Pat. No. 7,099,067 B2 (2006); "Modulator with Improved Sensitivity and Lifetime", Xianhai Chen, U.S. Pat. No. 7,817,333 B2 (2010); the entirety of each of the above referenced patents is hereby incorporated herein by reference and suitable for combination in accordance with embodiments described herein.

As used herein, UV light refers to ultraviolet light.

As used herein, NCAP refers to nematic curvilinear aligned phase.

As used herein, PDLC refers to polymer dispersed liquid crystal.

As used herein, ChLC refers to cholesteric liquid crystal.

In many embodiments, the switching voltage corresponds to an amount of voltage to provide an amount of light transmission. For example, a fifty percent transmission threshold (hereinafter "V50") corresponds to the amount of voltage sufficient to provide an amount light transmission corresponding to about 50% of a maximum amount of light transmission, and a ninety percent transmission threshold (hereinafter "V90") corresponds to the amount of voltage sufficient to provide an amount light transmission corresponding to about 90% of the maximum amount of light transmission.

The liquid crystal material as described herein may comprise an encapsulated PNLC and can be used in many ways and may be combined with many LC devices, for example LC modulators. The liquid crystal material may comprise an encapsulated PNLC having an interfacial agent combined and polymer network so as do decrease substantially the switching time and the driving voltage of the LC modulator. The LC materials as described herein a well suited for use at ambient temperatures within a range from about 0 degrees Centigrade to about 60 degrees Centigrade.

The liquid crystal material comprising the encapsulated PNLC may comprise one or more of the following material properties suitable for combination with the electro-optical modulator:

1. Low driving voltage. Modulators made of the low driving voltage electro-optical material as described herein can be operated at high air gaps above the AM-LCD TFT panels, while still maintain good defect detection sensitivity.

2. Substantially rigid mechanical properties. The electro-optical modulator can be protected by a thin Mylar film and lifted by an air bearing during use. In many embodiments, an air flow under the modulator surface can be provided so as to lift the modulator with no substantial material deformation or performance degradation. For example, the air flow may correspond to a pressure of about 90 pounds per square inch (hereinafter "psi").

3. Low dielectric constant. The low dielectric constant permits an air gap between TFT panel and modulator. The lower dielectric constant provides an increased voltage on the modulator material layer. The low dielectric constant can be within a range from about 3 to about 7.

4. Fast switching to provide a fast response to changes in the voltages applied to the panels under test.

The liquid crystal material as described herein may comprise sufficient polymer such that the LC material can be sufficiently rigid. By encapsulating PNLC (or PSLC), the polymer matrix can provide mechanical strength and the electro-optical performance can be substantially improved. A percentage of polymer of at least about 25% can be sufficient so as to provide acceptable mechanical properties of the LC material for modulator applications.

Figure 1:
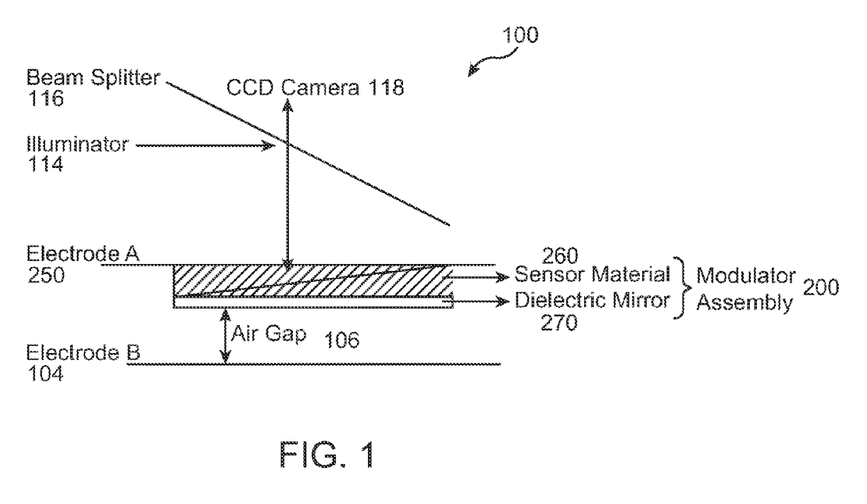
FIG. 1 shows a schematic illustration of a voltage imaging system including an electro-optical modulator comprised of LC/polymer sensor material, in accordance with embodiments of the present invention.

FIG. 1 schematically shows components of a voltage imaging system 100 for TFT inspection and suitable for combination in accordance embodiments. Components of the voltage imaging system may comprise one or more components as described in U.S. Pat. No. 7,639,319, and/or components of commercially available voltage imaging systems. Voltage imaging system 100 may comprise an electro-optic modulator assembly 200, an illuminator 114, a beam splitter 116 and a CCD camera 118. Electro-optic modulator assembly 200 can include a transparent electrode 250 (Electrode A), a transparent substrate 220 to support the transparent electrode 250, a polymer network liquid crystal sensor material 260, and a dielectric mirror 270 supported by a thin plastic film, for example a pellicle. Transparent electrode 250 may comprise a thin film made of indium tin oxide (ITO), which is transparent to visible light. The liquid crystal sensor material 260 has electro-optical response under an electric field. An Electrode B 104 can comprise the panel under test (PUT), for example a TFT plate. By applying voltage to transparent electrode 250 (Electrode A) and ground to the Electrode B, a transmission-voltage (T-V) curve can be obtained. For TFT testing, when a constant voltage near the middle of response curve is applied to the modulator, the voltage applied on each pixel can be detected in terms of light intensity change from CCD camera 118. A defective pixel will provide an abnormal response.

The voltage applied between Electrodes A and B can be expressed by the following equations:

$$V_{Bias} = V_{sensor} + V_{pellicle} + V_{air} \quad [\text{Eq. 1}]$$
$$= V_{sensor}[1 + (\varepsilon_{sensor} * d_{pellicle}) / (\varepsilon_{pellicle} * d_{sensor}) + (\varepsilon_{sensor} * d_{air}) / d_{sensor}]$$

$V_{Bias}$ is the voltage applied between Electrode A and Electrode B;

$V_{sensor}$ is the required voltage for sensor material;

$V_{pellicle}$ and $V_{air}$ are the voltages across pellicle and air gap;

$\in$ is the dielectric constants of the respective material, and d is the thickness of the respective material.

With a fixed $V_{Bias}$, the air gap between the electrodes, $d_{air}$, is a function of the intrinsic operating voltage ($V_{sensor}$) of the liquid crystal sensor material. In many embodiments, the intrinsic switching voltage of the liquid crystal sensor material corresponds to the voltage across the sensor material at which light transmission through the sensor material has a maximum sensitivity to a change in voltage across the sensor material, as explained more fully below with reference to FIGS. 3A and 3B. In many embodiments, the operating voltage across the electrodes is related to the intrinsic switching voltage of the LC material by use of the above equations. The switching time can be decreased by providing a material with a decreased intrinsic switching voltage.

Figure 2A:
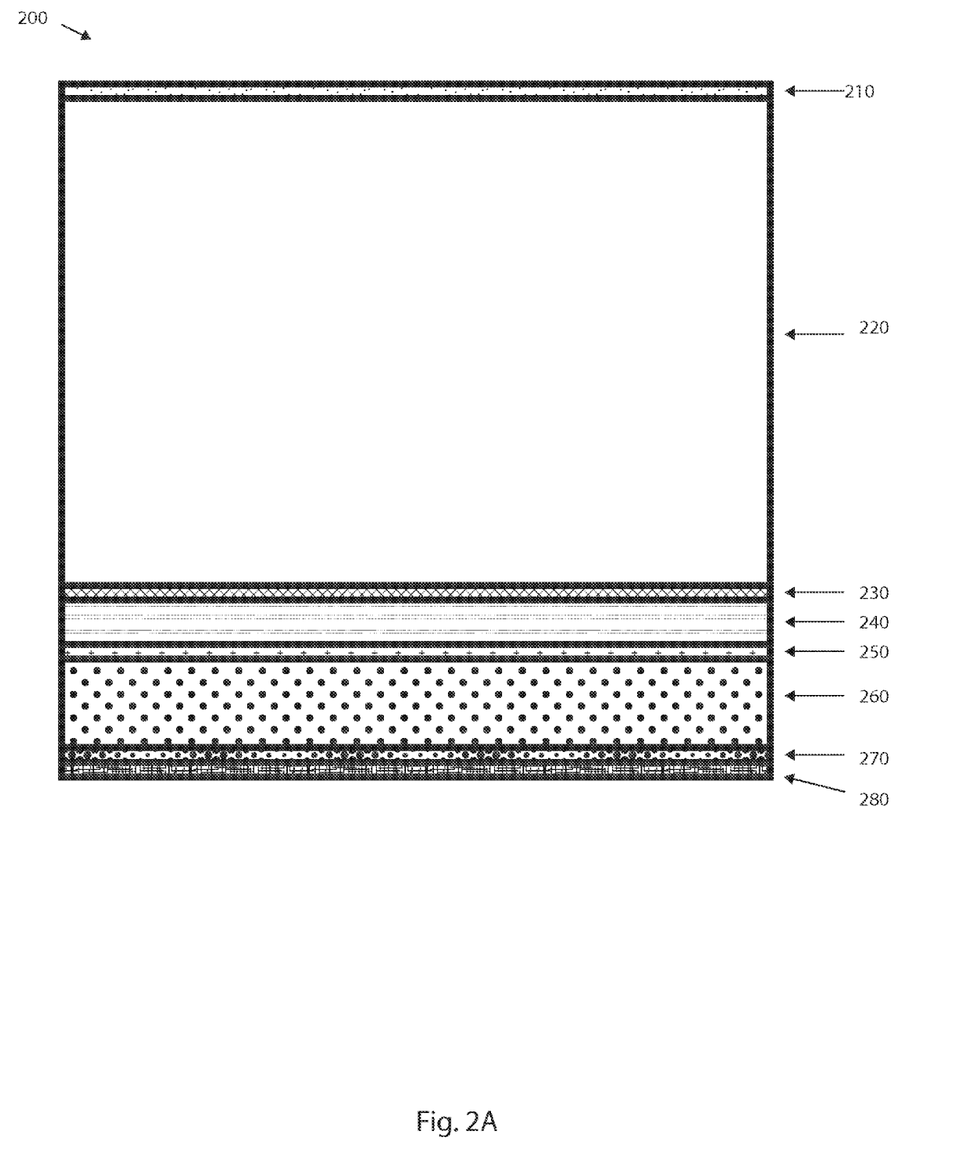
FIG. 2A shows a schematic illustration of an electro-optical modulator assembly comprising a liquid crystal sensor material, in accordance with embodiments of the present invention.

FIG. 2A shows a schematic illustration of electro-optical modulator assembly 200. The modulator assembly 200 comprises a sensor material 260. The sensor material 260 may comprise an encapsulated polymer network liquid crystal material as described herein. The modulator assembly may comprise an antireflective coating 210. The modulator assembly may comprise an optically transparent support substrate such as an optical glass 220. The antireflective coating 210 can be deposited on an upper surface of the optical glass 220. An optical adhesive 230 can be located on a lower surface of the optical glass 220. A layer of a polyester film 240 comprising stretched polyethylene terephthalate (PET), commercially available as Mylar™, can be coupled to the optical glass with the adhesive 230. An optically transparent electrode 250 such as ITO can be coupled to the polyester film 240. The encapsulated polymer network liquid crystal sensor material 260 can be coupled to the optically transparent electrode 250. A dielectric pellicle mirror 270 comprising dielectric mirror layers deposited on a thin film of PET, for example Mylar™, can be coupled to a lower surface of the encapsulated polymer network liquid crystal sensor material. An organic hard coat 280 can be affixed to the dielectric pellicle mirror 250. The organic hard coat 280 may comprise components of the hard coat described in U.S. Pat. No. 7,099,067.

Figure 2B:
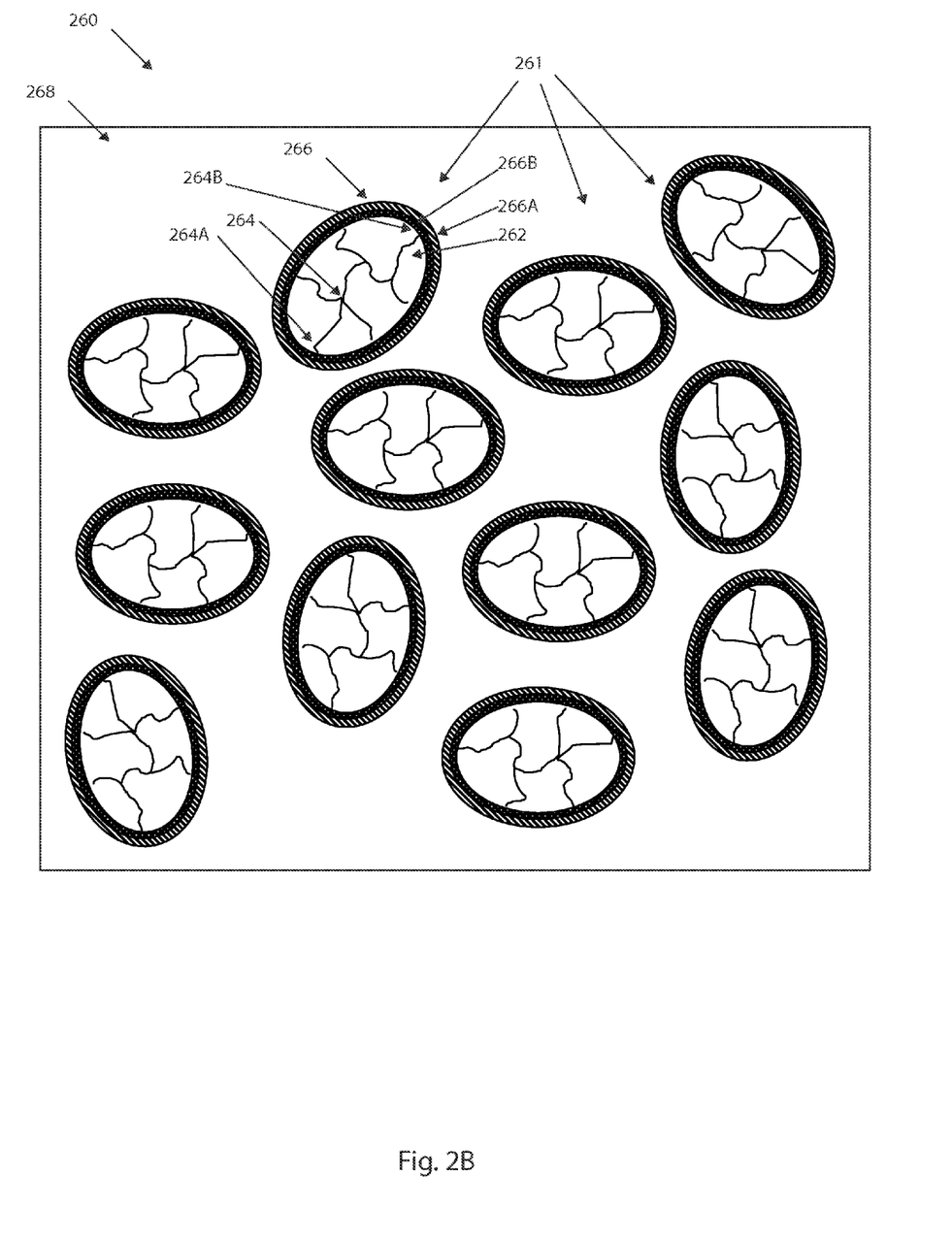
FIG. 2B shows a schematic illustration of a liquid crystal material sensor material, in accordance with embodiments of the present invention.

FIG. 2B shows a schematic illustration of the sensor material 260 comprising the encapsulated polymer network liquid crystal sensor material in accordance with embodiments. The sensor material 260 comprises a plurality of droplets 261 of liquid crystal material 262. Each of the plurality of droplets may comprise polymer network 264 extending substantially across the droplet. An interfacial layer 266 can encapsulate each of the plurality of droplets 261. A polymer matrix 268 can be located around the plurality of droplets so as to contain the plurality of droplets with the matrix 268. The interfacial layer 266 may comprise a first portion 266A to couple to the polymer matrix 268 and a second portion 266B to couple to the surface of the liquid crystal droplet so as to decrease surface tension of the liquid crystal droplet. The polymer network 264 may comprise a plurality of cross-linked polymer chains. The polymer network 264 can extend substantially across the droplet from a first end 264A to a second end 264B, so as to decrease a switching voltage. The first end 264A and the second end 264B of the polymer network 264 can be coupled to the interfacial layer 266 without substantial anchoring of the polymer network 264 to the interfacial layer 266, for example.

The liquid crystal sensor material 260 may comprise one or more of three components so as to decrease substantially the switching voltage, such as the V90 or the V50, for example. The liquid crystal material 262, the polymer network 264 and the interfacial layer 266 may each comprise one or more materials so to decrease the surface tension of the liquid crystal droplet and lower the corresponding switching voltage of the liquid crystal droplet. The polymer network may comprise a fluorinated acrylate, or a silicone acrylate, or combinations thereof, for example. The interfacial layer may comprise one or more components to decrease the surface tension and switching voltage. The liquid crystal material may comprise a liquid crystal material suitable for combination with the polymer network and interfacial layer so as to provide the decreased V90 and corresponding surface tension.

The liquid crystal of the LC material 262 may comprise one or more of nematic LC, ferroelectric LC, Blue Phase LC, LC/Dichroic Dye mixture, or ChLC, for example. For dichroic dye+LC system, dichroic dye can absorb light in the off-state and transmits light in the on-state, which will improve the light transmission voltage sensitivity corresponding to slope of s-curve by using higher light intensity. The liquid crystal material can be substantially hydrophobic such that droplets of the LC material can be formed with the emulsion, and such that the prepolymer and photo-initiator can be substantially dissolved in the LC droplets. The prepolymer and photo-initiator can be substantially hydrophobic, such that the liquid crystal droplets of the emulsion comprise most of the photo-initiator and prepolymer mixture.

The polymer matrix material 268 may comprise one or more water based polymers such as poly vinyl alcohol (PVA), water based latex, such as Neorez R-967 (manufactured by NeoResins, a division of DSM.). The amount of polymer matrix material may correspond to the strength and rigidity of the sensor material. The weight ratio of liquid crystal material to polymer matrix material can be within a range from about 50/50 to about 80/20, for example. The increased amount of polymer matrix material can increase the strength of the sensor material.

The polymer network 264 may comprise one or more materials so as to lower substantially the switching voltage of the liquid crystal material of the droplet. For example, the polymer network may comprise a material to decrease a surface tension of said each droplet so as to decrease a light transmission voltage such as the fifty percent light transmission voltage or the ninety percent light transmission voltage, or both, for example. The polymer network may comprise a plurality of cross linked polymer chains. The polymer chains may comprise carboxylic acid esters having aliphatic carbon chains comprising one or more of unsubstituted aliphatic carbon chains or substituted aliphatic carbon chains to lower the switching voltage and surface tension of each liquid crystal droplet. The substituted aliphatic carbon chains may comprise fluorinated aliphatic carbon chains to lower the surface tension, for example. The polymer chains may comprise a plurality of polyacrylate chains comprising esters of acrylic acid. Alternatively or in combination, the polymer network may comprise silicone acrylate. The aliphatic chains of the esters may comprise fluorinated aliphatic chains to decrease the switching voltage, such as fluorinated aliphatic chains acrylates for example.

The liquid crystal material 262 can scatter light when no voltage is applied, and the polymer network 264 can increase light scattering of the liquid crystal material so as to improve contrast.

The polymer network comprising the plurality of crosslinked polymer chains can be coupled to an inner surface of the interfacial layer 266 with no more than weak molecular interactions and without substantial cross-linking chemical bonds extending between the inner surface and the plurality of crosslinked polymer chains. The polyacrylate esters of the prepolymer(s) and monomer(s) as described herein may not form cross-linking chemical bonds to the interfacial layer 266, such that cross-linking of the polymer network to the interfacial layer with chemical bonds can be inhibited.

Figure 2C:
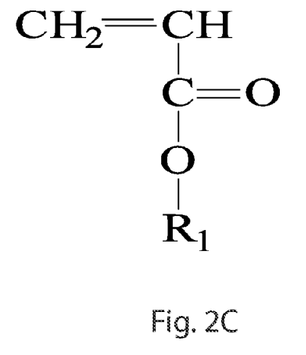
FIG. 2C shows acrylate monomer suitable for use with the polymer network, in accordance with embodiments of the present invention.

FIG. 2C shows acrylate monomer suitable for use with the polymer network.

Figure 2D:
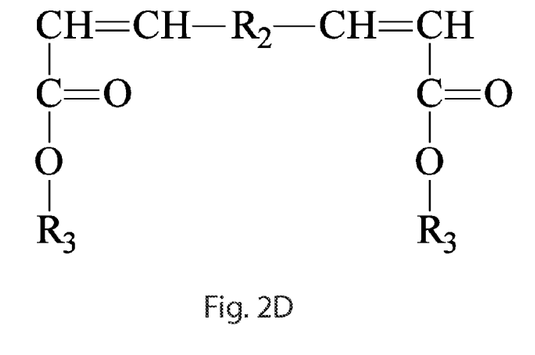
FIG. 2D shows di-acrylate prepolymer suitable for use with the polymer network, in accordance with embodiments of the present invention.

FIG. 2D shows di-acrylate prepolymer suitable for use with the polymer network.

Figure 2E:
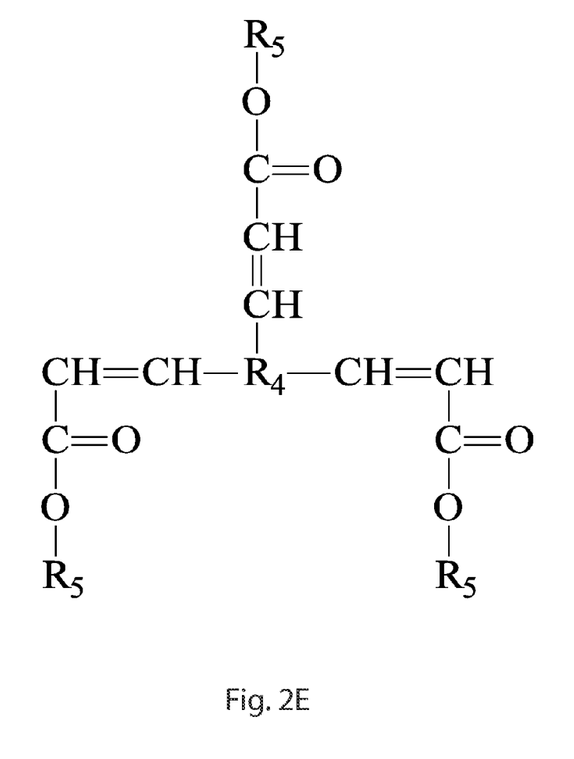
FIG. 2E shows tri-acrylate prepolymer suitable for use with the polymer network, in accordance with embodiments of the present invention.

FIG. 2E shows tri-acrylate prepolymer suitable for use with the polymer network.

The aliphatic groups R1~R5 may comprise one or more of alkyl groups or fluorinated alkyl groups, for example. Work in relation to embodiments suggests that fluorinated alkyl groups can decrease the switching voltage substantially and may provide decreased surface tension to the droplet of LC material to lower the switching voltage.

The three or more types of acrylate prepolymers, including mono-acrylate, di-acrylate, and tri-acrylate, multifunctional acrylate, or mixtures thereof, can be combined in many ways so as to provide the polymer network having the decreased switching voltage. In many embodiments no substantial chemical linkage is formed between the cross-linked polymer network and polymer matrix material. For example, polymer network can be formed with the interfacial layer 266 contacting the polymer network without substantial chemical linkages extending from the polymer network to the interfacial layer, for example. In embodiments without interfacial layer 266, the polymer network can form without substantial chemical linkages extending between the polymer network and the polymer matrix, for example. Alternatively or in combination, one or more of pre-polymers that forms the polymer network may comprise the substituted alkyl group having fluorine to decrease the switching voltage.

The acrylate prepolymers can be soluble in the LC material and at least partially hydrophobic, such that the acrylate prepolymer is dissolved substantially in the LC material and not substantially dissolved in the aqueous material surrounding each droplet.

The photo-initiator may comprise one or more of many known photo-initiators soluble in the LC material so as to polymerize and crosslink the prepolymer. Examples of suitable photo-initiators include Irgacure series and Darocur series from Ciba Specialty Chemicals, Lucirin TPO from BASF, and Escure series from Sartomer, etc.

The interfacial layer 266 comprises an interfacial agent material. The sensor material may comprise from about 0% up to about 10% by weight of interfacial agents that can be added during emulsification. The interfacial agent can be mixed with the liquid crystal and polymer material in order to decrease the anchoring and/or frictional force among the LC droplets, the polymer network and the polymer matrix. In many embodiments, interfacial agent material may comprise a non-ionic interfacial agent, such as block co-polymers, and/or cross-linkable reactive surfactants. The interfacial agent can form interfacial layer when the agent comprises the molecules that include two parts with appropriate chemical characteristics and the interfacial agent is present in sufficient quantity during formation of the LC material. A first portion 266A of the interfacial agent, for example a polymer compatible portion of the interfacial agent molecule, can be located near the polymer matrix, and a second portion 266B, for example a low surface tension portion of the interfacial agent molecule, can be located near the droplet and contacts the droplet so as to decrease friction and/or anchoring of the LC material. The first portion 266A of the interfacial agent can be dissolved in the polymer matrix 268 so as to effectively immobilize the interfacial agent within the polymer matrix. The immobilization of the interfacial layer 266 to the polymer matrix 268 may be either physical (for block copolymers) or chemical bonding (via cross-linking as in the case of reactive surfactants), or combinations thereof. This immobilization of the interfacial layer can provide increased stability, for example at increased temperature, of the interfacial layer. The second portion 266B of the interfacial agent comprised within the interfacial layer may have a chemical composition that presents low surface tension and/or low friction to the LC molecules and/or crystals. The anchoring and/or friction between the LC molecules, the polymer network, and the polymer matrix can be reduced by the interfacial layer, and thus alignment orientation and switching speed of the LC molecules when an electric field is applied can occur faster and at lower drive voltages.

TABLE 1

Examples of Interfacial Agents

| Name | Description | Manufacturer |
|---|---|---|
| BYK-022 | Mixture of hydrophobic solids and foam destroying polysiloxanes in polyglycol | BYK Chemie |
| Fluorolink D10 | A-CF$_2$O(CF$_2$CF$_2$O)$_m$(CF$_2$O)$_n$CF$_2$-A, A = CH$_2$OH, MW = 1000 | Solvay Solexis |
| Fluorolink D | A-CF$_2$O(CF$_2$CF$_2$O)$_m$(CF$_2$O)$_n$CF$_2$-A, A = CH$_2$OH, MW = 500 | Solvay Solexis |
| Surfynol DF-58 | A silicone-based foam control agent useful in aqueous systems. The product has strong foam control and de-aeration performance. | Air Products |
| Surfynol DF-62 | An ether-modified polysiloxane-based defoamer designed to provide excellent knockdown defoaming and sustained antifoaming over time. | Air Products |

TABLE 1-continued

Examples of Interfacial Agents

| Name | Description | Manufacturer |
|---|---|---|
| Surfynol DF-574 | A self-emulsifying product formulated with organic and organo-modified silicone components, which provides effective removal of entrained air and foam generated during the manufacturing process. | Air Products |
| Surfynol DF-695 | A silicone emulsion defoamer, which provides initial and sustained defoaming performance in water-based formulations. 100% active liquid. | Air Products |
| Flexiwet NI-M100 | Partially fluorinated alcohol that has been ethoxylated | Innovative Chemical Technologies, Inc. |
| Flexiwet NI-55 | Nonionic (fluoro) polymer surfactant with no functionality | Innovative Chemical Technologies, Inc. |

Table 1 is a partial list of interfacial agents that may be combined with the LC material and polymer network in accordance with embodiments of the present invention. The interfacial agents may be combined with NCAP based materials, so as to provide the polymer network liquid crystal sensor material. As shown in the examples herein, driving voltages can be reduced substantially, for example by adding small percentage of non-ionic interfacial agents with the emulsion comprising the polymer network material. The low surface tension portion of the interfacial agent molecules may comprise fluorinated compounds such as Fluorolink D or Flexiwet, or may comprise silicone copolymers or polymer-siloxanes such as Surfynol DF-62, BYK-022. In particular, the reactive fluorinated compounds may have chemical structures noted in Table 1, and the siloxanes may have reactive end groups such as —OH, —NH$_2$, or —COOH, for example.

In many embodiments, these materials move to the LC/polymer interface during LC/polymer phase separation process. The other portion of the interfacial agent molecules may physically bond to the polymer via such mechanisms as hydrogen bonding, Van Der Waals forces, and/or chemical bonding when there are reactive groups in the polymer matrix. Slight heating may accelerate the chemical bonding process.

The polymer network liquid crystal sensor material can show improvement in the switching voltage of both latex based NCAP and water soluble polymer (such as PVA) based NCAP, using the cross-linked polymer network and interfacial agent surfactants such as those listed in Table 1. In many embodiments, a pronounced improvement in intrinsic switching voltage sensitivity can be achieved using the polymer network and interfacial agents having defoaming properties. For example, the polymer network combined with Surfynol DF series compounds can substantially reduce the operating voltage of latex-based NCAP.

Defoaming agents are a class of surfactants that can be dispersed in an aqueous medium, and the interfacial agent of the interfacial layer 266 may comprise one or more defoaming agents. In many embodiments, defoaming agents have a very low solubility in an aqueous medium, and may have a HLB (hydrophile-lipophile balance) less than 10. Because the defoaming agent may have very low solubility in water, the defoaming agent can form small clusters. Each of the clusters can comprise molecules with a first portion and a second portion. The first portion 266A of the molecules of the cluster can have hydrophilic properties and the second portion of molecules of the cluster can have hydrophobic properties, as described above. In many embodiments, the clusters may have micelle shapes with the first portion oriented outward toward the solution and second portion oriented inward toward the other molecules of the defoamer cluster. During emulsification, the clusters can inhibit formation of foam by breaking many air bubbles. After emulsification and de-gas, the clusters are free to move within the mixture of LC droplets having the polymer network material, water based polymer and water. In many embodiments, the clusters can migrate toward the surface of LC droplet having the polymer network material. As the emulsion is dried, the defoamer can form an interface agent layer 266 around the LC droplet having the polymer network material, such that the interface layer 266 is located between the LC droplet having the polymer network material and the polymer matrix. In many embodiments, the low surface tension end portion of the defoamer molecule is dispersed adjacent to the LC droplet having the polymer network material so as to form the second portion 266B of the interfacial layer 266, and the anchoring end portion of the defoamer molecule becomes tied to the polymer matrix so as to form the first portion 266A of the interfacial layer 266.

TABLE 2

Examples of Formulations of PNLC materials.

| Ex. | Liquid Crystal (% weight) | Polymer Matrix (% weight) | Polymer Network (% weight) | | | | Interfacial Agent (% weight) |
|---|---|---|---|---|---|---|---|
| | | | Mono-acrylate | Di-acrylate | Tri-acrylate | Fluorinated acrylate | |
| 1 | 57.4 | 28.7 | 2.4 | 0 | 1.2 | 1.2 | 9.2 |
| 2 | 58.6 | 29.3 | 2.4 | 0 | 1.2 | 1.2 | 7.0 |
| 3 | 59.5 | 29.8 | 1.8 | 0 | 0.9 | 0.9 | 7.1 |
| 4 | 59.5 | 29.8 | 1.8 | 1.2 | 0 | 0.6 | 7.1 |
| 5 | 59.5 | 29.8 | 1.8 | 0.6 | 0.6 | 0.6 | 7.1 |

Table 2 shows formulations of the PNLC matrix emulsion material in accordance with embodiments. The weight percentages refer to the weight of the formulation when the emulsion is dried, based on the weight ratios of the ingredients. The polymer network material may comprise a fluorinated acrylate compound, and the interfacial agent may comprise one or more of a fluorinated or silicone based material. The fluorinated and/or silicone material of the polymer network and interfacial agent may decrease the surface tension of the liquid crystal droplet substantially and may decrease the switching voltage of the material substantially.

Figure 3A:
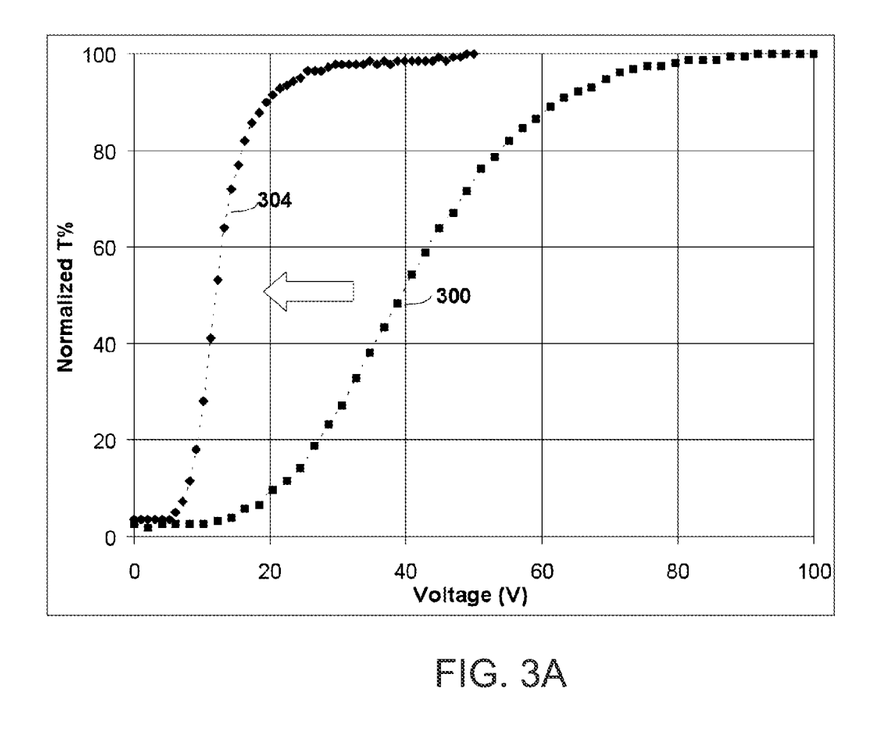
FIG. 3A shows an example of transmission-bias voltage curves for an LC/polymer composite sandwiched between two ITO substrates, in accordance with embodiments of the present invention.

FIG. 3A shows an example of a transmission-bias voltage curve 304 for sensor materials comprising the polymer network 264 and interfacial layer 266. A curve 302 illustrates voltage response characteristics of LC/polymer composition materials without an interfacial agent combined with the polymer network as described herein. For improved electro-optical modulator performance, the goal is to shift the voltage response curve to curve 304 that is steeper and shifted to a lower voltage. In many embodiments, this voltage response characteristic can allow higher sensitivity at lower operating voltage, and can also allow a larger air gap at the same operating voltage. In some embodiments, this voltage response characteristic allows a higher sensitivity with a lower operating voltage and a larger air gap. The higher sensitivity can lead to improved defect detection. The increased air gap can provide longer modulator life.

Figure 3B:
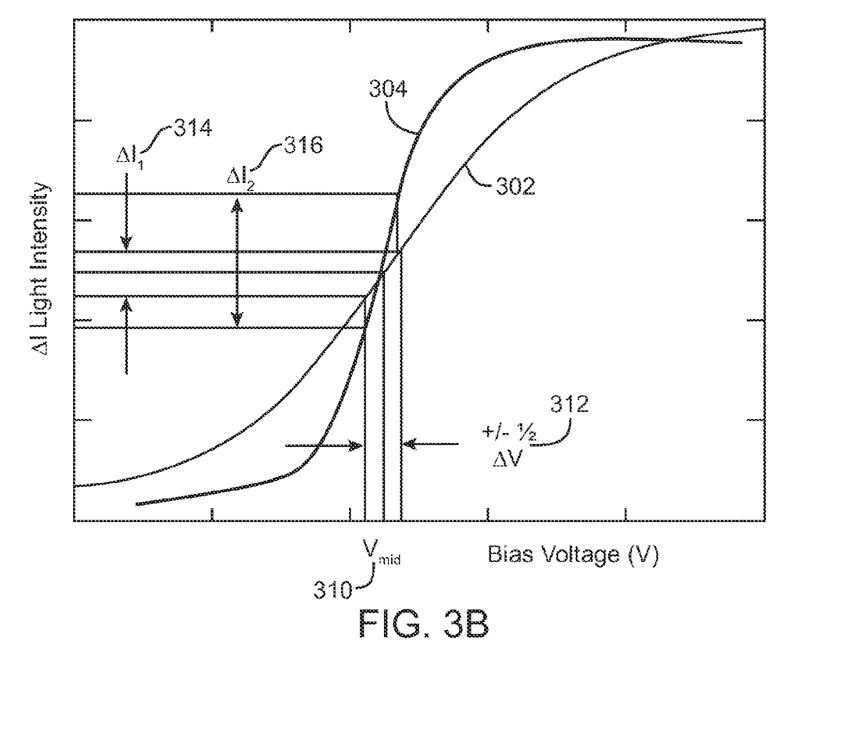
FIG. 3B shows an example of transmission-bias voltage curve for LC/polymer composite modulators, with operating point, in accordance with embodiments of the present invention.

The slope of the transmission curve reflects the sensitivity of the LC device. The sensitivity of the LC imaging device, expressed as the slope of the transmission curve, generally corresponds to the change in transmission in percent (%) per change in voltage applied across Electrode A and Electrode B, described above. As shown in FIG. 3B, the midpoint of the transmission curve is roughly determined for a voltage $V_{mid}$ 310 and with no voltage on the TFT plate, and at a fixed gap size between the plate and the LC device. Then, a small change in voltage $+/-\frac{1}{2}$ $\Delta V$ 312 is applied to a pixel on the TFT plate, and the change in transmission is measured. For transmission curve 302 the change in transmission is $\Delta I_1$ 314 for the voltage $+/-\frac{1}{2}$ $\Delta V$ applied to the pixel. For steeper transmission curve 304, the change in transmission is $\Delta I_2$ 316 for the same $+/-\frac{1}{2}$ $\Delta V$ 312 applied to the pixel, and $\Delta I_2$ is greater than $\Delta I_1$. Thus, for the same change in voltage applied to a pixel, a greater signal ($\Delta I_2$) results if the transmission curve is steeper.

In TFT testing system, the signal captured by the CCD (118 in FIG. 1) is proportional to the slope of the modulator transmission curve. According to Equation 1, the transmission curve gets flatter (slope reduced) if the air gap ($d_{air}$) is increased to avoid modulator damage and/or improve the life time. The voltage distributed on the modulator will decrease with larger air gap. The sensitivity can be improved by reducing the intrinsic switching voltage of the LC material in the modulator, such that the voltage imaging system device will have a reduced intrinsic operating voltage.

In many embodiments, the reduced intrinsic switching voltage of the electro-optic LC materials described herein, can be used to provide an increased air gap without substantially compromising the sensitivity of the voltage imaging system. The air gap can be at least about 75 micrometers, for example about 100 micrometers or more.

The operating voltage and sensitivity of liquid crystal sensing materials such as NCAP or PDLC are related to:
1. Properties of liquid crystal and polymer matrix;
2. Liquid crystal droplet size distribution in sensor material;
3. Characteristics of polymer network material, and
4. Interface properties between polymer matrix and liquid crystal.

In many embodiments, the slope of the curves in FIGS. 3A and 3B is affected by the droplet size distribution and the interface properties between the polymer matrix, the interfacial layer, the polymer network and the liquid crystal. A steeper slope can result if droplets are of uniform size and if the crystals within the LC droplet can move and/or switch easily relative to the polymer matrix. The voltage shift of the curve shown in FIGS. 3A and 3B can be affected by the interface properties between the polymer matrix and liquid crystal. The curve may shift to lower voltage if the LC can move and/or switch easily relative to the polymer matrix. Embodiments of the present invention reduce the interface anchoring and/or friction between the polymer matrix and liquid crystal in order to make the T-V curve slope steeper and also to shift the operating voltage of LC material and the voltage imaging system to a lower range. Anchoring of the LC molecules to the polymer matrix can increase the intrinsic operating voltage of the LC material. Alternatively or in combination, anchoring of the polymer network to the LC material may slightly increase the intrinsic operating voltage of the LC material, which may be overcome by introducing low surface tension polymer network material, for example. Frictional forces can comprise anchoring forces that may be associated with static friction of the LC molecules to the polymer matrix and may also comprise dynamic friction associated with relative motion among the LC molecules, the polymer matrix, and the polymer network. As friction may affect the speed at which molecules move in relation to the surrounding polymer matrix, decreased friction may increase the switching speed of the LC molecules. As an increase in voltage may be required to overcome anchoring of the LC molecules to the polymer matrix or the polymer network, increased anchoring may be related to an increased intrinsic operating voltage of the LC composite material.

Method of Making an Encapsulated Polymer Network Liquid Crystal

Figure 4A:
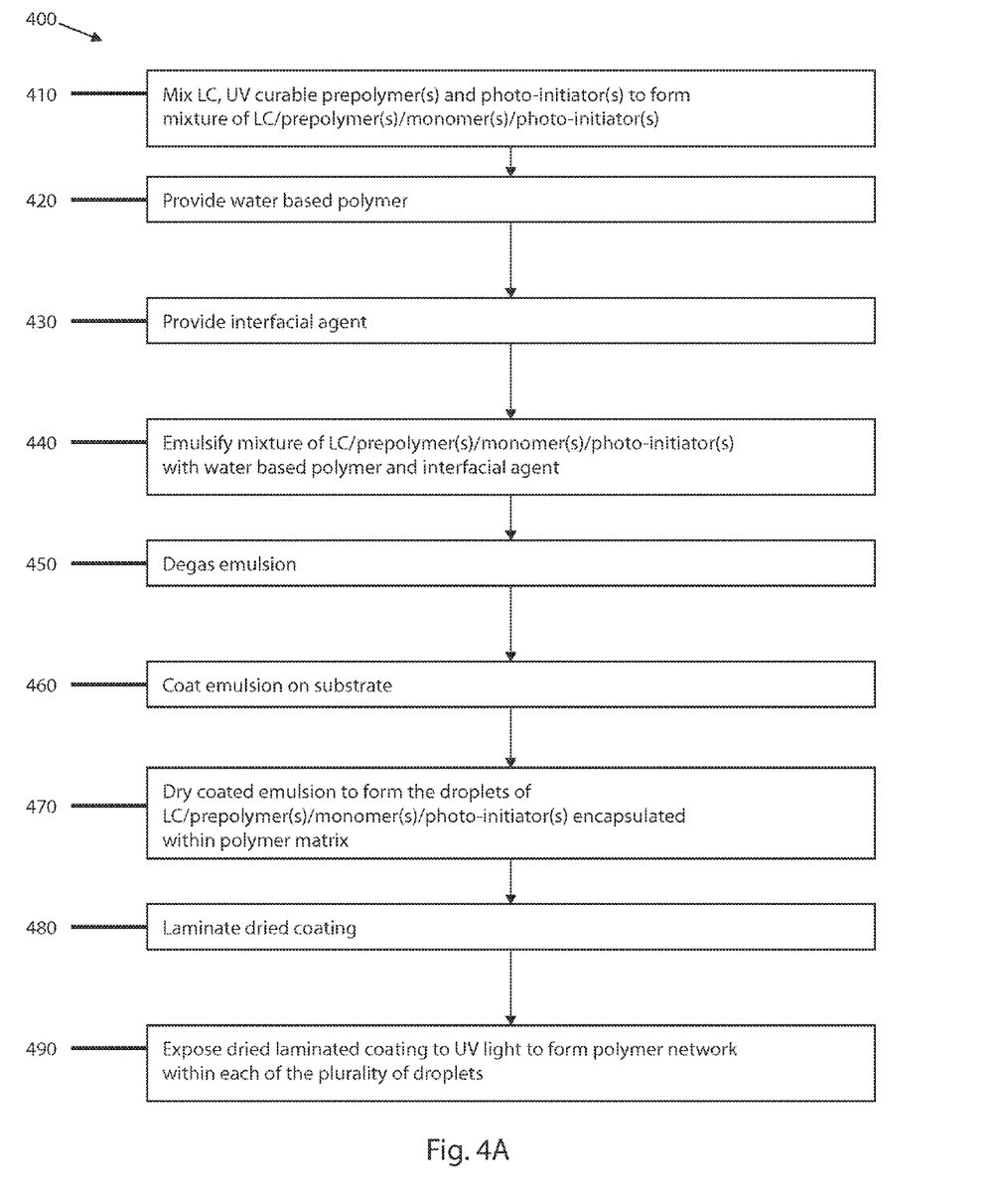
FIG. 4A shows a method of making an electro-optical modulator assembly comprising the polymer network liquid crystal material, in accordance with embodiments of the present invention.

FIG. 4A shows a method 400 of making an encapsulated polymer network liquid crystal material.

With a step 410, liquid crystal is mixed with photo-initiator(s) and one or more of UV curable prepolymer(s) or monomer(s) so as to form a mixture (hereinafter "LC/monomer/prepolymer(s)/monomer(s)/photoinitiator mixture"). The prepolymer may comprise monoacrylate, a diacrylate, a triacrylate, or combinations thereof, for example. Examples of UV curable prepolymers or monomers include many free radical curable compounds such as acrylates, di-acrylates, and multi-functional acrylates, thiol-ene resins, and fluorinated acrylates, and mixtures of these compounds as described herein.

Many liquid crystals can be used. Examples include nematic LC, ferroelectric LC, Blue Phase LC, LC/Dichroic Dye mixture, ChLC, etc. (For dichroic dye+LC system, dichroic dye absorbs light in off-state and transmits light in on-state, which will improve the slope of s-curve (or sensitivity) by using higher light intensity). Monomers or prepolymers, and photo-initiators can be selected so as to provide substantially complete solubility in liquid crystal before curing.

With a step 420, a water based polymer is provided, such as one or more of polyvinyl alcohol (PVA) or water based latex. The water based latex may comprise acrylate latex or polyurethane latex, or combinations thereof, as described herein for example.

With a step 430, an interfacial agent is provided. The interfacial agent may comprise one or more of a surfactant, a diblock copolymer, or a defoamer, for example as shown in Table I. Examples of interfacial layer materials are described in U.S. Pat. No. 7,817,333, previously incorporated by reference and suitable for combination in accordance with at least some embodiments as described herein.

With a step 440, the above LC/UV curable polymer and photo-initiator mix is emulsified by the water based polymers such as the water soluble polymers or water based latex polymers. Many emulsification methods can be used. Examples include mechanical stirring, blending, microfluidics, homogenizer, etc. The droplet size of the LC/monomer/prepolymer(s)/photoinitiator mixture can be controlled and may be within the range from about 1 to about 10 microns.

With a step 450, the emulsion is degassed.

With a step 460, the emulsion is coated on a substrate with transparent or semi-transparent electrode, such as indium tin oxide (ITO—allows application of a bias voltage to the LC material). Many wet coating methods can be used. Examples include wire wound rod, doctor blade, slot die, extrusion, spinning, spay, inkjet, etc.

With a step 470, the coated emulsion is dried. After drying, the droplets of LC/prepolymer(s)/photo-initiator(s) mixture are encapsulated within polymer matrix 268.

Figure 4B:
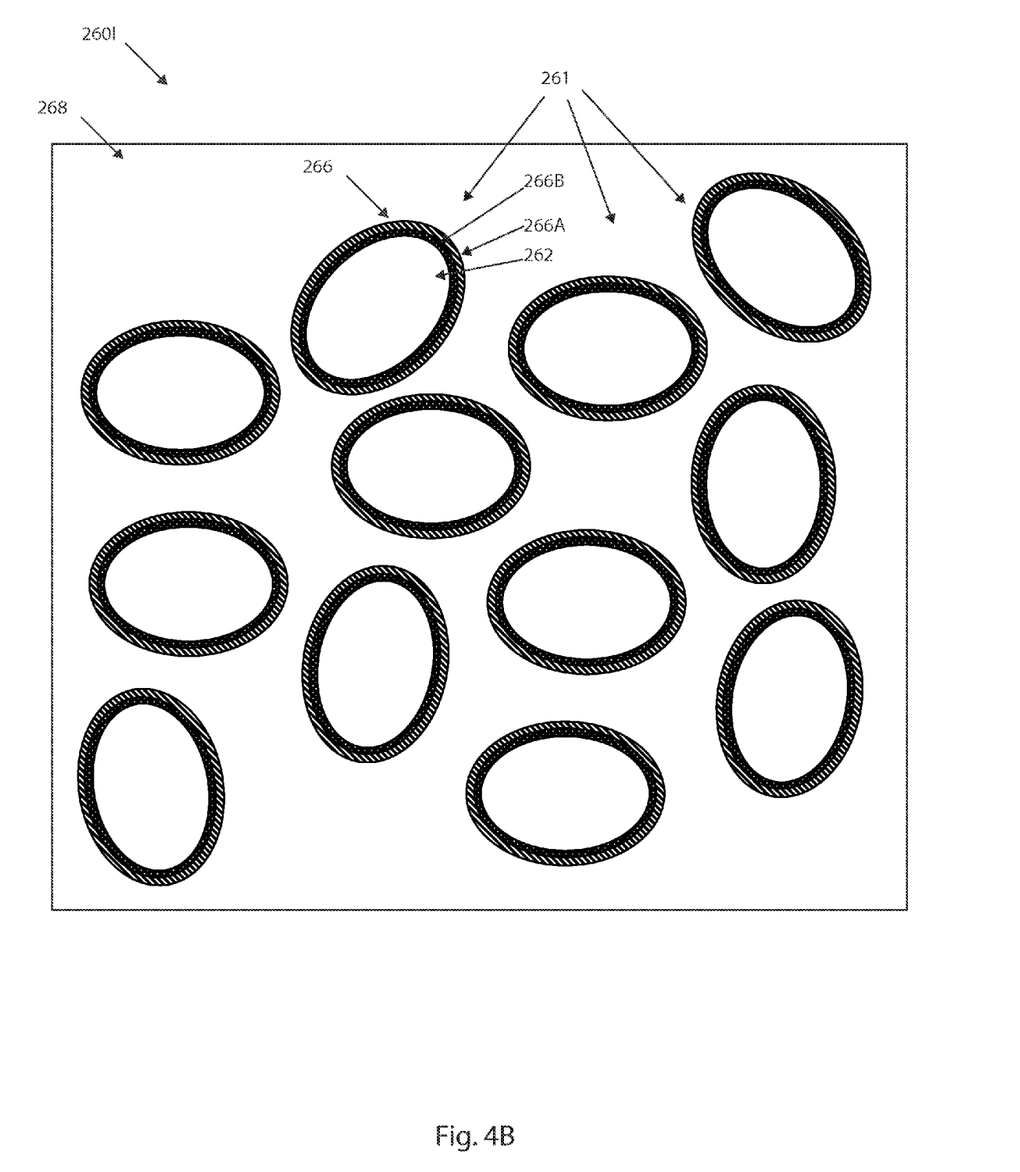
FIG. 4B shows an intermediate sensor material after drying the emulsion and prior to exposure to UV light.

FIG. 4B shows an intermediate material 260I after drying the emulsion and prior to exposure to UV light. The intermediate material 260I comprises the plurality of droplets 261 of the LC/prepolymer(s)/photo-initiator(s) mixture encapsulated within the interfacial layer 266 and the dried polymer matrix 268.

With a step 480, and the coating is laminated with another substrate with or without the transparent or semi-transparent electrode.

With a step 490, the sandwiched film is exposed to ultraviolet light. The UV curable monomer(s), or prepolymer(s), or mixtures thereof, is cured and/or crosslinked so as to form a polymer network within the droplets as shown in FIG. 2B, for example. Preferably, fluorinated monomers, or their mixture with non-fluorinated monomers can be used to form network walls extending substantially across the LC droplet so as decrease surface tension of the LC droplet and further reduce the driving voltage.

It should be appreciated that the specific steps illustrated in FIG. 4 provide a particular method of making an encapsulated polymer network liquid crystal material, in accordance with embodiments of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art will recognize many variations, modifications, and alternatives.

Experimental

Experiments have been conducted to determine the hardness and optical switching of sensor material of modulator 200 fabricated in accordance with embodiments of method 400. The sensor material made by method 400 has significantly improved electro-optical performance as compared to encapsulated liquid crystal without polymer network (NCAP or PDLC) with similar percentage of polymer and significantly improved hardness as compared to prior polymer network materials without encapsulation.

The following procedure was followed in accordance with method 400 to fabricate the modulator 200 having sensor material in accordance with embodiments as described herein.

1. Acrylate prepolymers were mixed with 0.5~10 wt-% photo-initiators. Examples of acrylate prepolymers include many monoacrylates, di-acrylates, tri-acrylates, fluorinated acrylates and their mixtures. Many free radical photo-initiators can be used. Examples include Irgacure series and Darocur series from Ciba Specialty Chemicals, Lucirin TPO from BASF, Escure series from Sartomer, and their combinations, etc. As an example, a mixture of Darocur and TPO can be used.

2. Liquid crystal was mixed with above acrylates/photo-initiators within a weight ratio range from about 99/1 to 90/10.

3. The above mixture of liquid crystal, acrylates and photo-initiators were emulsified with water soluble polymer such as PVA or water based latex such as Neorez R-967 (manufactured NeoResins a division of DSM) with a weight ratio in the range of 50/50 to 80/20. Up to 10 wt-% of Surfynol interfacial agents can be added during emulsification.

4. The above NCAP emulsion was then coated on a substrate with an ITO film, allowed to dry and laminated with another ITO substrate.

5. The above sandwiched film was exposed under UV light for about 2 minutes. UV light with a wavelength of about 365 nm and an intensity of 5~50 mW/cm2 can be used.

6. The transmission curve is measured. At least 25% lower driving voltage between the electrodes is required for the encapsulated PNLC compared with NCAP without polymer network within droplets.

Figure 5:
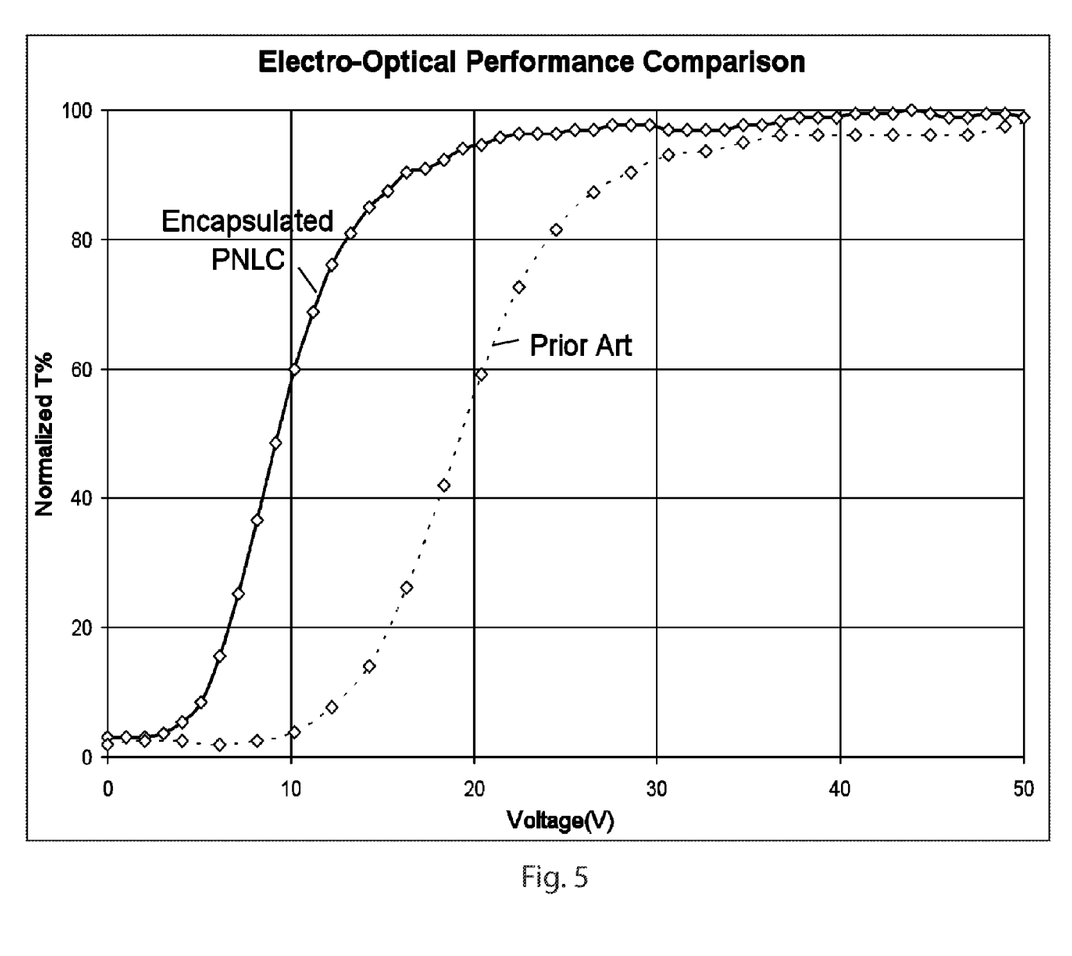
FIG. 5 shows measured electro-optical properties of an assembly comprising encapsulated PNLC, sandwiched between two ITO Mylar films, in accordance with embodiments.

FIG. 5 shows measured electro-optical properties of an assembly comprising encapsulated PNLC, about 24 μm thick sandwiched between two ITO Mylar films, in accordance with embodiments. The percent light transmission as a function of voltage is shown as separate curves for the encapsulated PNLC versus a comparison material as described U.S. Pat. No. 7,817,333. The comparison material comprises an encapsulated liquid crystal with substantially the same ingredients (polymer matrix, liquid crystal, interfacial compounds, and corresponding ratios) and droplet sizes but without polymer network within droplets. The driving voltage can be reduced by at least about 25% by providing the polymer network, for example approximately 50%. The V90 for the encapsulated PNLC was about 16V and about 28V for the prior material. The V50 (voltage for 50% transmission) for the encapsulated PNLC and prior material were about 9V and about 18V, respectively.

As the switching voltage corresponds to the localized electric field strength where the LC droplets are located, it may be worth noting the thickness of the film measured. In general, switching voltage is proportional to thickness, and the voltage can be adjusted, for example normalized, based on thickness so as to compare the LC material of films have different thickness. For example, a V90 in the range of about 15~20V for 12 μm thick film may correspond substantially to a V90 in the range of about 30~40V for 24 μm thick film. Therefore, a V90 for the encapsulated PNLC materials as described herein in the range of about 15~20V for 24 μm thick films corresponds to a V90 in the range of about 7.5~10V range for a 12 μm thick film.

An electro-optical modulator in accordance with the embodiments of FIG. 2A has been assembled by using the encapsulated PNLC made above. The modulator can be operated at greater than 100 um gap above TFT panel without defect detection sensitivity reduction. The modulator can also be operated at lower air gaps with substantial improved sensitivity. For example, greater than 30% improvement in sensitivity has been observed at 75 um air gap compared to the modulator made of liquid crystal material without polymer network as in U.S. Pat. No. 7,817,333.

While the exemplary embodiments have been described in some detail, by way of example and for clarity of understanding, those of skill in the art will recognize that a variety of modifications, adaptations, and changes may be employed. Hence, the scope of the present invention should be limited solely by the appended claims.

What is claimed is:

1. A liquid crystal sensor material, comprising:
 a plurality of liquid crystal droplets, each droplet comprising a liquid crystal material and a polymer network comprising a plurality of crosslinked polymer chains wherein the polymer network is configured to decrease a light transmission voltage of said sensor material;

a polymer matrix located around each of the plurality of liquid crystal droplets such that said each of the plurality of liquid crystal droplets is located within the polymer matrix; and an interfacial layer located between the polymer matrix and said each of the liquid crystal droplets so as to encapsulate said each of the plurality of liquid crystal droplets with the interfacial layer and inhibit coupling of the networked polymer with the interfacial layer, wherein the polymer network comprising the plurality of crosslinked polymer chains extends to the interfacial layer without substantially anchoring to the interfacial layer, and wherein the polymer network comprising the plurality of crosslinked polymer chains extends substantially across said each droplet from a first portion of the interfacial layer on a first side of said each droplet to a second portion of the interfacial layer on a second side of said each droplet.

2. The liquid crystal sensor material of claim 1, wherein the polymer network decreases a fifty percent light transmission voltage of the plurality of liquid crystal droplets by an amount corresponding to at least about 25% lower than without the polymer network.

3. The liquid crystal sensor material of claim 2, wherein the polymer network comprises a material to decrease a surface tension of said each droplet so as to decrease the fifty percent light transmission voltage of the plurality of liquid crystal droplets by the amount.

4. The liquid crystal sensor material of claim 3, wherein the plurality of cross linked polymer chains comprises carboxylic acid esters having aliphatic carbon chains comprising one or more of unsubstituted aliphatic carbon chains or substituted aliphatic carbon chains to lower the surface tension of said each liquid crystal droplet.

5. The liquid crystal sensor material of claim 4, wherein the substituted aliphatic carbon chains to lower surface tension of said each liquid crystal droplet comprises fluorinated aliphatic carbon chains to lower the surface tension.

6. The liquid crystal sensor material of claim 1, wherein said polymer network of said each droplet comprises a plurality of polyacrylate chains comprising esters of acrylic acid.

7. The liquid crystal sensor material of claim 1, wherein said polymer network of said each droplet comprises silicone acrylate.

8. The liquid crystal sensor material of claim 1 wherein the polymer network comprising the plurality of crosslinked polymer chains comprises fluorinated acrylate so as to decrease surface tension and friction of said each liquid crystal droplet in contact with said interfacial layer.

9. The liquid crystal sensor material of claim 1, wherein the polymer network comprising the plurality of crosslinked polymer chains of said each droplet is coupled to an inner surface of the interfacial layer with no more than weak molecular interactions and without substantial cross-linking chemical bonds extending between the inner surface and the plurality of crosslinked polymer chains.

10. The liquid crystal sensor material of claim 1, wherein the interfacial layer of said each droplet of liquid crystal material comprises a bilayer having an inner hydrophobic side and an outer hydrophilic side, wherein the inner hydrophobic side contacts the polymer network without anchoring and contacts the liquid crystal material so as to decrease substantially a fifty percent light transmission voltage of the plurality of liquid crystal droplets.

11. The liquid crystal sensor material of claim 1, wherein the polymer network comprises a free radical cured monomer or polymer soluble in the liquid crystal material comprising one or more of an acrylate, a di-acrylate, a multi-functional acrylate, a thiol-ene resin, a silicone acrylate or a fluorinated acrylate and wherein the liquid crystal comprises one or more of nematic LC, ferroelectric LC, Blue Phase LC, LC/Dichroic Dye mixture ChLC and wherein the wherein the interfacial layer comprises one or more of diblock copolymer or reactive interfacial agent.

12. The liquid crystal sensor material of claim 1, wherein the polymer matrix comprises one or more of a poly vinyl alcohol (PVA), a water based latex, a water based acrylic latex, or a water based polyurethane latex and wherein the interfacial layer comprises one or more of diblock copolymer or interfacial agent.

13. A liquid crystal sensor material, comprising:

a plurality of liquid crystal droplets, each droplet comprising a liquid crystal material and a polymer network comprising a plurality of crosslinked polymer chains;

a polymer matrix located around each of the plurality of liquid crystal droplets such that said each of the plurality of liquid crystal droplets is located within the polymer matrix; and an interfacial agent located between the polymer matrix and said each of the liquid crystal droplets so as to encapsulate said each of the plurality of liquid crystal droplets with the interfacial agent such that the polymer network is separated from the polymer matrix with the interfacial agent, wherein the polymer network comprising the plurality of crosslinked polymer chains extends to the interfacial layer without substantially anchoring to the interfacial layer, and wherein the polymer network comprising the plurality of crosslinked polymer chains extends substantially across said each droplet from a first portion of the interfacial layer on a side of said each droplet to a second portion of the interfacial layer on a second side of said each droplet.

14. A method of manufacturing a sensor material, the method comprising:

making an emulsion comprising a plurality of droplets of a liquid crystal material dispersed in an aqueous liquid, and an interfacial agent, the droplets comprising a prepolymer dissolved in the liquid crystal material, the aqueous liquid comprising a water based polymer, such that the interfacial agent encapsulates said each of the plurality of droplets to form an interfacial layer, wherein the interfacial agent and the polymer network together lower the surface tension of said each droplet;

drying the emulsion such that the water based polymer forms a polymer matrix located around each of the plurality of droplets; and curing the dried emulsion such that the prepolymer forms a polymer network within said each of the plurality of droplets when the polymer matrix is located around said each of the plurality of droplets, wherein the polymer network comprising the plurality of crosslinked polymer chains extends to the interfacial layer without substantially anchoring to the interfacial layer, and wherein the polymer network comprising the plurality of crosslinked polymer chains extends substantially across said each droplet from a first portion of the interfacial layer on a first side of said each droplet to a second portion of the interfacial layer on a second side of said each droplet.

15. The method of claim 14 wherein the polymer network decreases a fifty percent light transmission voltage of the plurality of liquid crystal droplets by an amount corresponding to at least about 25% lower than without the linked polymer network.

16. The method of claim 15 wherein the polymer network lowers a surface tension of said each of the plurality of droplets so as to decrease the fifty percent light transmission voltage of the plurality of liquid crystal droplets by the amount.

17. The method of claim 14 further comprising coating a surface with a layer of the emulsion of droplets of the liquid crystal material in the aqueous solution.

18. The method of claim 14 wherein the droplets of liquid crystal material comprising the dissolved prepolymer are exposed to the aqueous solution comprising the water soluble polymer.

19. An electro-optic modulator assembly, comprising:
a transparent substrate; and,
a liquid crystal sensor material supported with the transparent substrate, wherein the liquid crystal sensor material comprises a liquid crystal sensor material of claim 1.

* * * * *